(12) United States Patent
Eide et al.

(10) Patent No.: US 7,895,598 B2
(45) Date of Patent: Feb. 22, 2011

(54) PAGE AND DEVICE-OPTIMIZED CASCADING STYLE SHEETS

(75) Inventors: Darrin Eide, Bellevue, WA (US); David Anderson, Saratoga, WA (US); Joe Montgomery, San Francisco, CA (US); Stephane Karoubi, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 921 days.

(21) Appl. No.: 11/818,613

(22) Filed: Jun. 15, 2007

(65) Prior Publication Data

US 2008/0313659 A1 Dec. 18, 2008

(51) Int. Cl.
*G06F 13/00* (2006.01)
(52) U.S. Cl. ............... 719/311; 709/217; 709/219; 707/705; 707/707
(58) Field of Classification Search ............ 719/311; 709/217, 219; 707/705, 707
See application file for complete search history.

(56) References Cited

U.S. PATENT DOCUMENTS

| | | | |
|---|---|---|---|
| 6,023,714 A | 2/2000 | Hill et al. | |
| 6,589,291 B1 | 7/2003 | Boag et al. | |
| 6,732,330 B1 | 5/2004 | Claussen et al. | |
| 6,741,853 B1 | 5/2004 | Jiang et al. | |
| 6,772,396 B1 | 8/2004 | Cronin et al. | |
| 6,857,102 B1 | 2/2005 | Bickmore et al. | |
| 7,134,073 B1 | 11/2006 | Fiedorowicz et al. | |
| 7,200,809 B1 | 4/2007 | Paul et al. | |
| 7,774,788 B2 * | 8/2010 | Lopez | 719/311 |
| 2002/0010716 A1 | 1/2002 | McCartney et al. | |
| 2004/0019610 A1 * | 1/2004 | Burns | 707/104.1 |
| 2004/0107403 A1 | 6/2004 | Tetzchner | |
| 2004/0255244 A1 | 12/2004 | Filner et al. | |
| 2006/0224553 A1 * | 10/2006 | Chtcherbatchenko et al. | .. 707/1 |
| 2007/0240041 A1 * | 10/2007 | Pearson | 715/522 |
| 2010/0011284 A1 * | 1/2010 | Ramakrishna et al. | 715/234 |

OTHER PUBLICATIONS

"Dynamically Varying Master Pages by Browser Type".
Bert Bos, "Using CSS to Achieve Device-Independence", Position paper for "device context" workshop, Date: Mar. 2002.
Brett Nulf, "Wireless Service Creation with WebLogic Platform 8.1", Date: Jan. 29, 2004.
Kynn Bartlett, "Edapta Position Paper", Date: Oct. 3, 4, 2000, Device-Independent Workshop, Bristol, England.

* cited by examiner

*Primary Examiner*—Andy Ho
(74) *Attorney, Agent, or Firm*—Mayer & Williams PC

(57) ABSTRACT

An arrangement for generating page and/or device-optimized cascading style sheets ("CSS") is disclosed in which CSS blocks are provided in a collection of one or more files. In an illustrative example, the collection of files is arranged as XML (extensible Markup Language) files. Each CSS block is marked with attributes that indicate to which modules used to compose a page it applies, and/or its applicability to a specific device. At page rendering time, the CSS for the page is dynamically generated by selecting CSS blocks from the files based on detected device capabilities and/or the modules on the page.

20 Claims, 6 Drawing Sheets

```xml
<?xml version="1.0"?>
<xs:schema xmlns:xs="http://www.w3.org/2001/XMLSchema"
targetNamespace="http://www.w3schools.com"
xmlns="http://www.w3schools.com"
elementFormDefault="qualified">

<xs:element name="styles">
    <xs:complexType>
      <xs:sequence>
        <xs:element name="style" maxOccurs="unbounded">
          <xs:complexType>
            <xs:attribute name="apply-to-model">    ← 305
              <xs:simpleType>
                <xs:restriction base="xs:string">
                  <xs:enumeration value="RAZR" />
                  <xs:enumeration value="SLVR" />
                  <xs:enumeration value="700W" />
                  <xs:enumeration value="5600" />
                  <xs:enumeration value="6102" />      308
                  <xs:enumeration value="6103" />
                  <xs:enumeration value="VX8300" />
                  <xs:enumeration value="D807" />
                  <xs:enumeration value="Q" />
                </xs:restriction>
              </xs:simpleType>
            </xs:attribute>
            <xs:attribute name="apply-to-browser">    ← 311
              <xs:simpleType>
                <xs:restriction base="xs:string">
                  <xs:enumeration value="IEMobile" />
                  <xs:enumeration value="Openwave" />   314
                  <xs:enumeration value="MIB 2.2" />
                </xs:restriction>
              </xs:simpleType>
            </xs:attribute>
            <xs:attribute name="apply-to-markup">    ← 316
              <xs:simpleType>
                <xs:restriction base="xs:string">
                  <xs:enumeration value="Html" />      319
                  <xs:enumeration value="xHtml" />
                </xs:restriction>
              </xs:simpleType>
            </xs:attribute>
          </xs:complexType>
        </xs:element>
      </xs:sequence>
    </xs:complexType>
  </xs:element>

</xs:schema>
```

```
<?xml version="1.0" encoding="utf-8" standalone="yes"?>
<styles>
  <!-- This is a "wildcard" block meaning it would apply to every client -->
  <style apply-to-template="" apply-to-markup="" apply-to-browser="" apply-to-model="">
    a, a.link
    {
      color: black;
      text-decoration: none;
    }
    body
    {
      background-color: white;
    }
  </style>
  <!-- This would apply to all pages that are using the linklist template and all
  phones capable of displaying xHtml -->
  <style apply-to-template="MSNMobile_LinkList" apply-to-markup="xHtml" apply-to-browser="" apply-to-model="">
    .big
    {
      font-size: 110%;
    }
    body
    {
      font-size: 100%;
    }
  </style>
  <!-- This would apply to all RAZR phones w/an Openwave browser -->
  <style apply-to-template="" apply-to-markup="" apply-to-browser="Openwave" apply-to-model="RAZR">
    body
    {
      font-size: 10em;
    }
  </style>
</styles>
```

410 → (wildcard style block)
407 — (a, a.link and body rules)
415 — (LinkList xHtml style block)
420 — (RAZR Openwave style block)
400 — (document)

PAGE AND DEVICE-OPTIMIZED CASCADING STYLE SHEETS

BACKGROUND

Many online content publishing systems rely on cascading style sheets ("CSS") that includes style rules which tell a browser running on a desktop PC (personal computer), or a portable device like a mobile phone or pocket PC, how to present a document such as a web page. Typically, a CSS may be optimized by hand to eliminate unused styles for a particular scenario, or to create a customized version of the CSS for a specific target client agent. For example, a CSS may be customized to a specific desktop browser such as Microsoft Internet Explorer® or Mozilla Firefox®.

In comparison to the desktop PC environment, variations in CSS implementations for browsers on mobile devices are generally more numerous. Mobile devices vary widely in their page rendering capabilities and commonly employ different browser types and support different markup languages that are used to define pages. Mobile devices typically have limited memory resources and the networks on which they operate are often bandwidth-constrained so it is generally desirable to minimize the size of the CSS used for the pages. It is not reasonable, however, to require the use of multiple different CSS files per device or to employ multiple CSS versions for a given page in order to optimize the page size to a specific device. Accordingly, existing mobile content solutions tend to keep use of CSS to a minimum or use a one-size-fits-all approach to enable the CSS to be applied to as large a number of devices as possible. While such solutions are satisfactory in some applications, the richness of the user experience in other applications may be significantly diminished.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An arrangement for generating page and/or device-optimized CSS is provided in which CSS blocks are provided in a collection of one or more files. Each CSS block is marked with attributes that indicate to which modules used to compose a page it applies, and/or its applicability to a specific device. At page rendering time, the CSS for the page is dynamically generated by selecting CSS blocks from the files based on device capabilities and/or the modules on the page.

In various illustrative examples, the CSS blocks are stored in XML (eXtensible Markup Language) files that are accessed by a mobile CSS service in response to calls from a template that is utilized (with other templates, all of which include associated code) to construct a page being accessed by a device such as a mobile phone. The XML files include CSS blocks that are applicable to different scenarios that take into account the model or type of the mobile device that is consuming a page, the type of user agent or browser it supports, the markup language it supports, and the particular modules that define the page being accessed. The mobile CSS service dynamically tailors the CSS to be minimally sized and correct for the specific scenario by fetching XML files specified by the calling template; locating CSS blocks that are globally applicable as well as applicable to the specific scenario by constructing and applying an Xpath query, or other methodology for locating the applicable CSS blocks; retrieving and optimizing the applicable CSS; and then returning the dynamically generated and tailored CSS back to the calling template. The template inserts the CSS inline with the markup used to define the page which is then consumed by the accessing device.

Advantageously, use of page and/or device-optimized CSS can substantially enrich the experience of a user of the mobile device since a smaller amount of CSS presentation overhead typically enables more content to be put on a page. In addition, smaller pages use less bandwidth on resource constrained mobile communication networks and may minimize the potential of pages overflowing the capabilities of a mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 3 shows an illustrative CSS XML schema;

FIG. 4 shows an illustrative XML document that validates against the CSS XML schema shown in FIG. 3;

Similar reference numerals indicate similar elements in the drawings.

DETAILED DESCRIPTION

Cascading style sheets ("CSS") is a style language that is utilized by publishers of online content such as web pages to define the layout of content written in HTML (HyperText Markup Language) or a similar markup language. For example, CSS covers fonts, colors, margins, lines, height, width, background images, alignment and positioning, and other presentation considerations and thereby enables page content to be separated from page presentation. Such separation often enables more precise and sophisticated control over presentation, control of presentation of many mark up pages from a single style sheet, application of different presentation to different media types (e.g., on-screen display, print etc.) and can improve ease of site maintenance in many instances. Specifications for CSS are maintained by the World Wide Web Consortium ("W3C").

Figure 1:
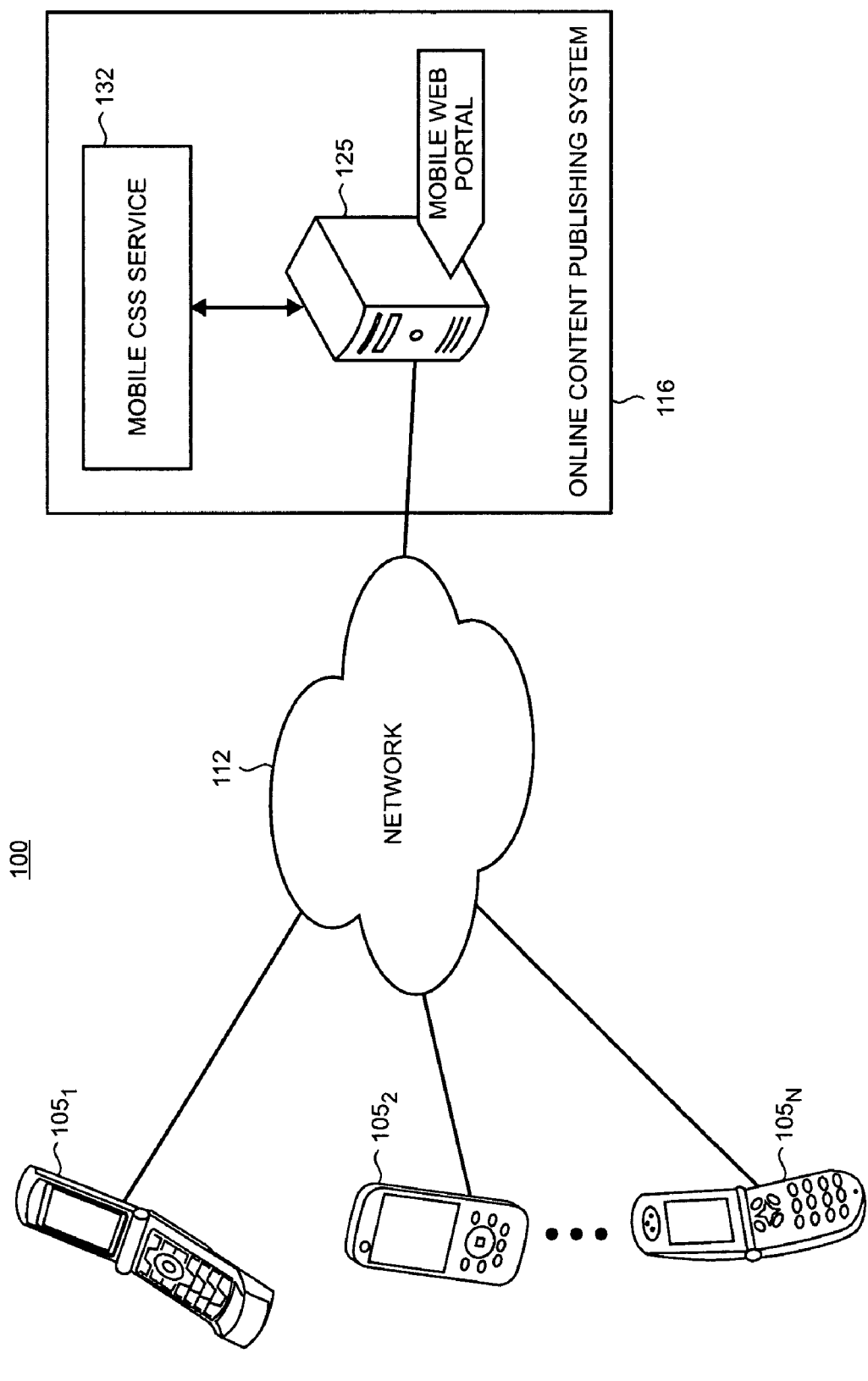
FIG. 1 shows an illustrative mobile communications environment in which the present page and device-optimized CSS may be implemented.

Turning now to the drawings, FIG. 1 shows an illustrative mobile communications environment 100 in which the present page and/or device-optimized CSS may be implemented. In environment 100, a variety of mobile (i.e., wireless) communications devices 105-1 . . . N are coupled to a network 112. Mobile devices 105 are representative of the various devices that are currently available with mobile web browsing capabilities and may include, for example, mobile phones, pocket PCs, handheld PCs, smart phones, PDAs (personal digital assistants), game devices, media content players, ultra-mobile PCs, and the like. Such devices are typically designed to be lightweight and portable and are generally equipped with relatively small display screens with lower resolution and greater memory constrictions as compared with their static desktop PC counterparts.

Mobile devices 105 can vary considerably in their configuration and capabilities. For example, they can host a variety of user agents (i.e., software applications used to render downloaded mobile content). These user agents may include browsers, for example, Microsoft Internet Explorer® Mobile, Palm Blazer®, Opera Mobile®, Opera Mini®, Openwave® Mobile Browser, and Motorola® Mobile Internet Browser ("MIB"). Processors, memory, screen size and resolution, color depth, page size capable of being displayed, and other characteristics can also vary significantly among mobile devices. As a result, there can be many thousands of different types and combinations of mobile devices that operate in the mobile communications environment 100.

Network 112 couples the mobile devices 105 to an online content publishing system 116. Network 112 typically comprises both wireless infrastructure and wired infrastructure and may include portions of publicly accessible or shared networks such as the Internet. In most applications, the network bandwidth provided to the mobile devices 105 is more limited than that available to wired desktop PCs.

Online content publishing system 116 enables mobile content to be published to users of the mobile devices 105. As shown in FIG. 1, online content publishing system 116 is arranged using a mobile web portal 125 (e.g., a server located in the online content publishing system 116) that provides pages of markup code to the mobile devices 105 which then render the content. Mobile web portal 125 is operatively coupled to a mobile CSS service 132 which dynamically provides CSS that is tailored to a specific scenario which is defined by the characteristics of a particular page being rendered as well as the capabilities of the specific mobile device that is consuming the content on the page.

Figure 2:
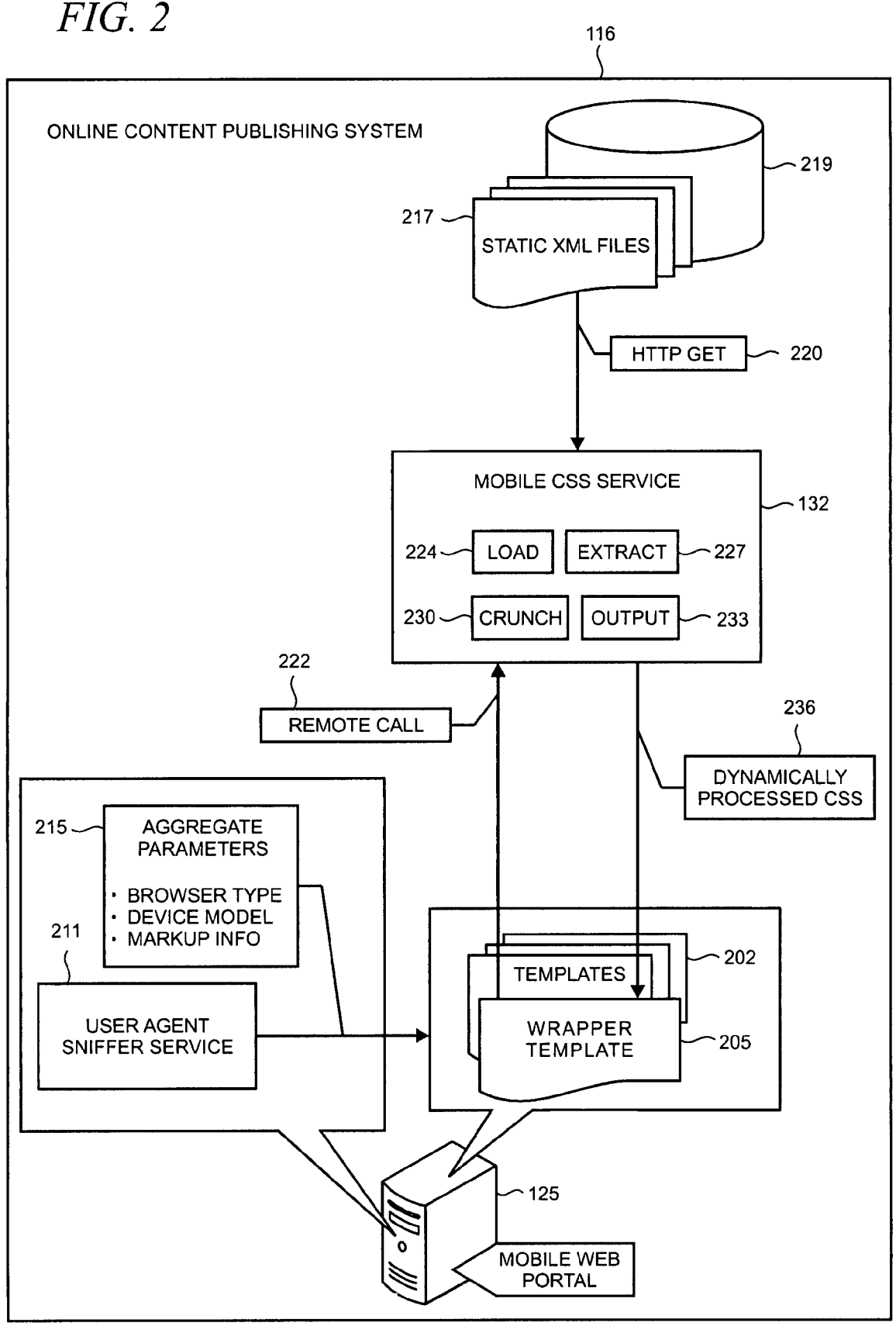
FIG. 2 shows details of the illustrative online content publishing system operating in the mobile communications environment shown in FIG. 1.

FIG. 2 shows details of the online content publishing system 116. The mobile web portal 125 is configured with a group of templates 202 which further includes a wrapper template 205. The templates 202 and the wrapper template 205 are initially set up by a site designer or developer to set up the content (e.g., one or more web pages) that is published by the online content publishing system 116. The templates have code associated with them which, when run, fetches the appropriate content which is transformed by the templates to thereby produce a given page. The wrapper template 205 is accordingly utilized to wrap the page.

In addition to setting up the templates to generate a page, the site designer or developer also sets up page-level metadata that is globally available to all other templates. The metadata includes parameters which identify the location of the XML files.

A user agent sniffer service 211 is arranged to run on the mobile web portal 125. In alternative implementations, the user agent sniffer service 211 runs as a service that is external to the mobile web portal 125.

In this illustrative example, when a mobile device 105 (FIG. 1) hits the mobile web portal 125 to access a site, the user agent sniffer service 211 retrieves a user agent string (not shown) from that mobile device. Such user agent strings typically vary by mobile device. The user agent sniffer service 211 mines the user agent string by performing a lookup in a data store or database to identify, in this illustrative example, the browser type, mobile device type (e.g., the mobile phone model), and markup type used by the mobile device (e.g., HTML, XHTML (eXtensible HTML), CHTML (Compact HTML), WML (Wireless Markup Language, etc.). The user agent sniffer service 211 inserts the mined information into a set of aggregate parameters 215 that can be used by other services or applications running on the mobile web portal 125. In alternative arrangements, the user agent sniffer service 211 is arranged to mine information from other data types, for example, header parameters such as "user_OS."

A plurality of XML (eXtensible Markup Language) files (collectively identified by reference numeral 217) is stored in a data store or database 219. Defining specifications for XML are maintained by the W3C organization. XML files 217 are considered static as they are typically defined in advance of the page's rendering time and generally change infrequently.

In this illustrative example, XML files 217 are arranged to include blocks of CSS that are accessed via an HTTP GET request 220 and consumed by the mobile CSS service 132. However, it is emphasized that the HTTP GET request is merely illustrative, as other conventional retrieval mechanisms may also be utilized as required by a particular scenario. For example, the XML files 217 could be read directly from an underlying file system. The CSS blocks in the XML files 217 are defined by attributes which specify which CSS blocks are applicable to a particular scenario.

Referring to FIG. 3, the XML files 217 shown in FIG. 2 are arranged in accordance with an illustrative schema 300 against which XML files used by the mobile CSS service 132 (FIG. 1) must be validated. That is, when a user or developer wants to define a new CSS block in the XML, they need to determine to which mobile device types (e.g., mobile phone model or type), or browser, or markup type (or combination of two or three of these characteristics) a particular CSS block is applicable, so that the appropriate attributes may be set.

As indicated by reference numeral 305, XML schema 300 defines an attribute named "apply-to-model" which uses a multiplicity of facets (i.e., constraints) to restrict the CSS blocks to named mobile devices among a set of models or types. In the illustrative schema 300, the set includes nine popular mobile device models as indicated by reference numeral 308 in FIG. 3.

Similarly, an attribute named "apply-to-browser" is indicated by reference numeral 311 in FIG. 3. Here, the illustrative browsers include Internet Explorer Mobile, Openwave, and MIB version 2.2, as indicated by reference numeral 314.

An attribute named "apply-to-markup" is indicated by reference numeral 316, where the markup languages illustratively include HTML, and XHTML, as indicated by reference numeral 319. It is emphasized that the particular model types, browser types and markup languages shown in XML schema 300 are merely illustrative as the present schema is intended to be extensible to other models, browsers and markup languages according to the requirements of a specific application.

FIG. 4 shows an illustrative XML file 400 that validates against the CSS XML schema 300 shown in FIG. 3. As indicated by reference numeral 407, a block of CSS code in XML file 400 is expressed to be globally applicable to all templates, devices, browsers, and markups through use of a "wildcard" block as indicated by reference numeral 410. Alternatively, empty attributes (e.g., as expressed by <style> . . . </style>) may simply be excluded.

As indicated by reference numeral 415, another block of CSS code in an XML file 400 is applicable to pages using a template named "MSNMobile_LinkList" and mobile devices that are capable of utilizing the XHTML markup language. Reference numeral 420 shows a block of CSS code that is applicable to a Motorola RAZR model mobile phone equipped with an Openwave browser.

The examples shown in FIG. 4 illustrate the application of "inclusion" logic whereby a particular block of CSS is expressed by the XML file to be specifically or globally applicable to a device, browser, or markup. However, it is emphasized that "exclusion" logic may also be applied in some applications of the present arrangement. In this case, the XML file will include markup to reflect that a block of CSS is applicable to all devices, browsers, and markups except for the ones that are specifically excluded.

Returning back to FIG. 2, the wrapper template 205 utilizes the mobile CSS service 132 via a remote call 222. In this illustrative example, the remote call is embedded in the <head> element for the page. The mobile CSS service 132, as shown in FIG. 2, includes a plurality of functional components that are arranged to dynamically generate CSS at the time the page is rendered so that the CSS is tailored to be minimally sized and correct for a specific scenario.

The functional components include a functional component 224 to load certain XML files identified by the remote call 222, a functional component 227 to extract the appropriate CSS from the XML files, a functional component 230 to crunch the CSS to perform various optimizations on the CSS code, and a functional component 233 to output the dynamically processed CSS 236 back to the calling wrapper template 205.

Figure 5:
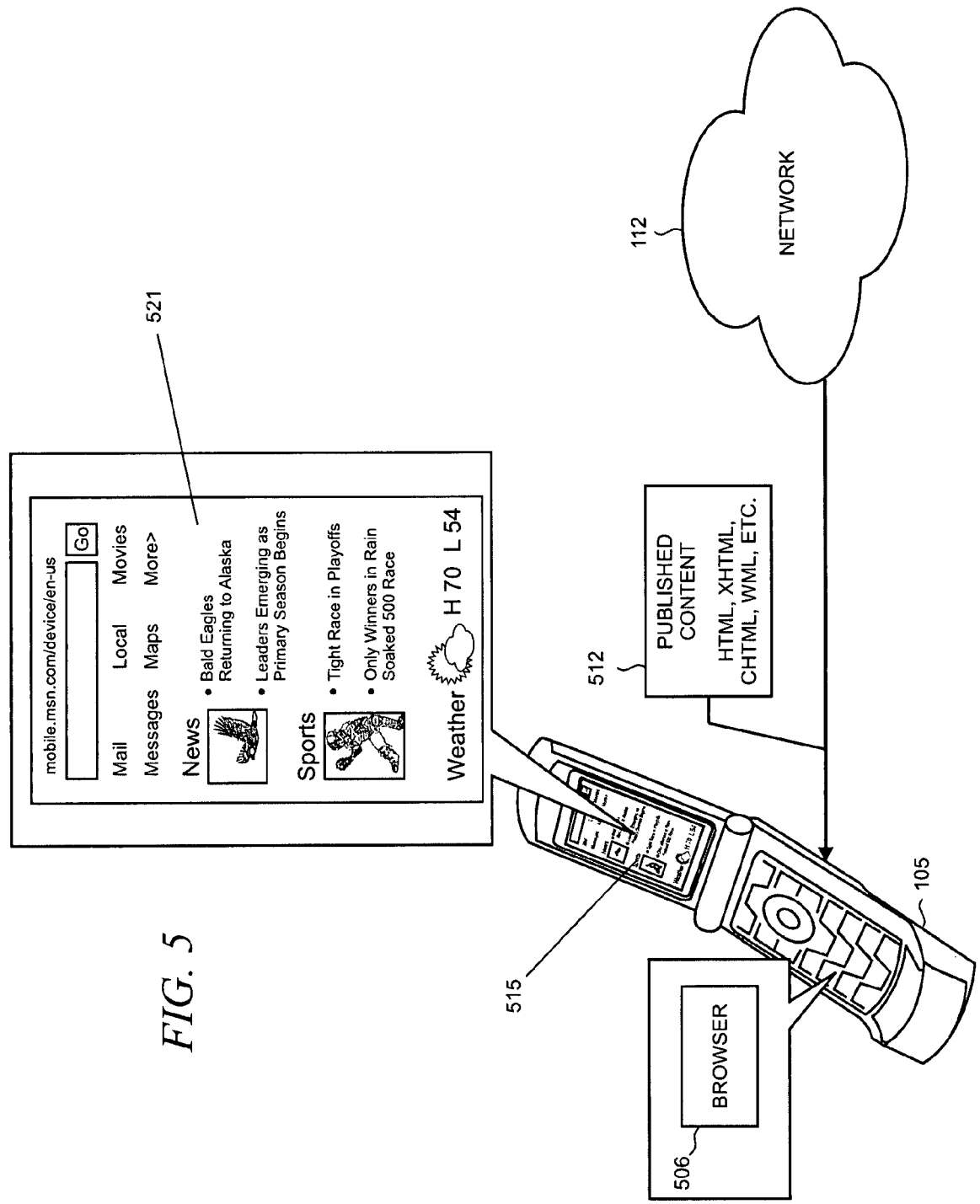
FIG. 5 shows details of an illustrative mobile device operating in the mobile communications environment shown in FIG. 1.

FIG. 5 shows details of an illustrative mobile device 105 operating in the mobile communications environment 100 shown in FIG. 1. Mobile device 105 supports a user agent or browser 506 which may include, for example, one of the browsers discussed above in the text accompanying FIG. 1. Browser 506 renders published content 512 (e.g., in the form of HTML, XHTML, CHMTL, WML etc.) received over the network 112 from online content publishing system 116 (FIG. 1).

Browser 506 renders the published content 512 onto a display screen 515 that is typically integrated with the mobile device 105. An illustrative screen shot 521 of the rendered content 512 is shown in FIG. 5. As shown, the rendered page in this example includes a number of modules or sections having links to various content including mail, messaging (such as instant messaging services), local information, maps, movies, news, sports, and weather. Accordingly, a given site is typically composed of a number of linked pages each containing varying individual modules or service calls.

Without the benefit of the present arrangement for page and/or device-optimized CSS, the CSS would be ordinarily arranged to be common to all of the pages and modules. Thus, for a typical site which may have 10, 20, or more linked pages, each with various modules, the CSS might ordinarily consume as much as 4½ to 5 kilobytes ("KB") of a page. As some mobile devices are memory limited to page sizes as low as 10 to 20 KB, such CSS presentation overhead could significantly limit the amount of content that can be put on a given page.

By contrast, the present arrangement, in this illustrative example, specifically tailors the CSS to the particular modules on the page to thereby keep the CSS as small as possible. Identification of modules on a given page is provided to the mobile CSS service 132 via the remote call 222 from the wrapper template 205, as shown in FIG. 2.

In combination with the device-specific CSS optimization described above, the CSS presentation overhead can commonly be reduced to less than 2 KB which can substantially enrich the experience of a user of the mobile device since more content is enabled to be put on a page. In addition, smaller pages use less bandwidth on the typically resource-constrained mobile communication networks and minimize the potential of pages overflowing the capabilities of a mobile device.

Figure 6:
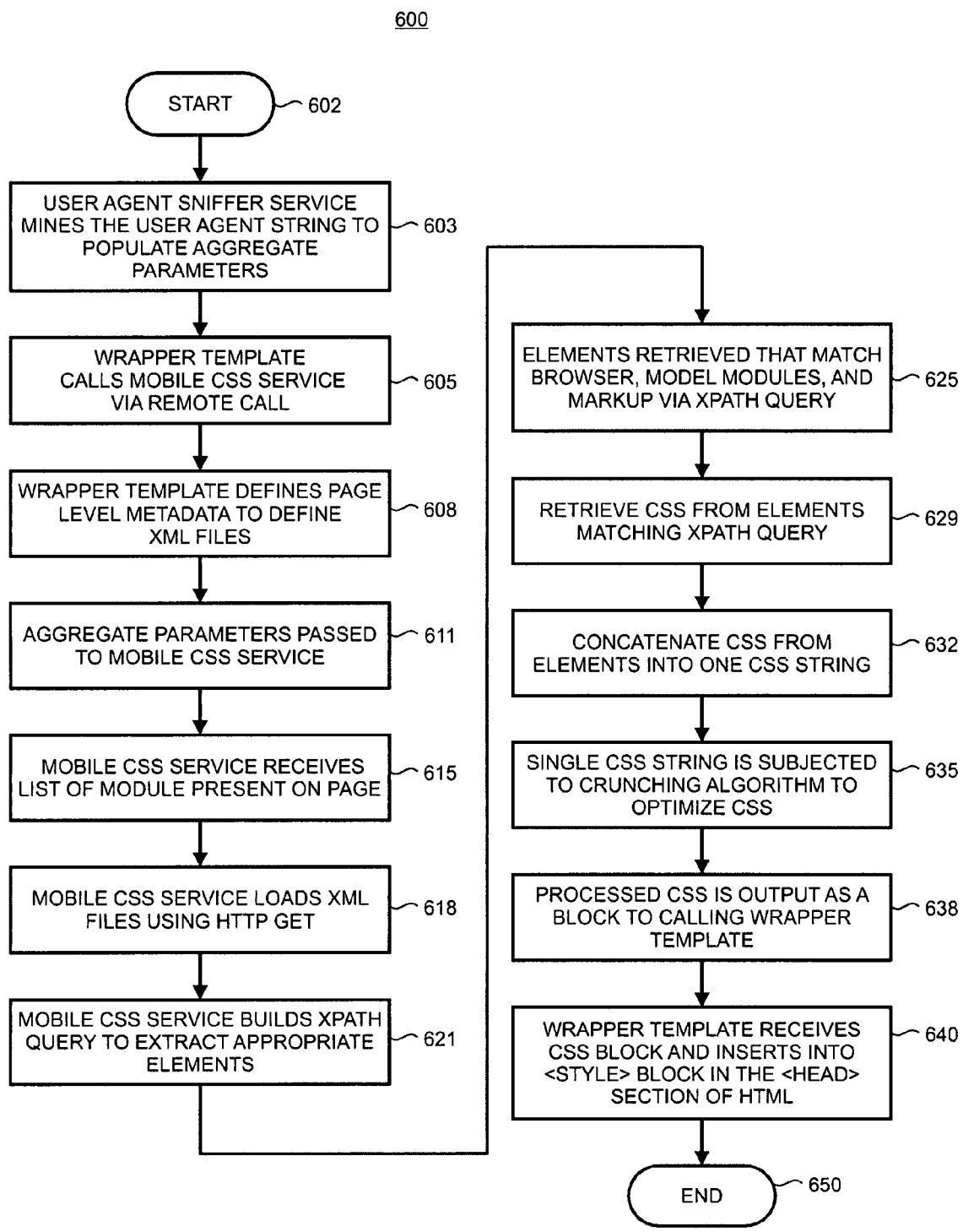
FIG. 6 is a flowchart of an illustrative method for facilitating page and device-optimized CSS.

FIG. 6 is a flowchart of an illustrative method 600 for facilitating the dynamic creation of page and device-optimized CSS. Method 600 is described referring to the elements shown in FIG. 2 and described in the accompanying text. The illustrative method starts at block 603 when a mobile device 105 (FIG. 1) hits the mobile web portal 125 requesting access to a page of online mobile content.

At block 603, the user agent sniffer service 211 mines the user agent string from the mobile device 105 in order to extract the browser type, the specific model of the mobile device 105, and the markup that is supported by the mobile device. The user agent sniffer service 211 populates this information into the aggregate parameters 215 which are made available to the wrapper template 205 and other services running on the mobile web portal 125.

At block 605, the wrapper template 205 makes a remote call 222 to the mobile CSS service 132. As noted above, the remote call 222 is preferably contained within a style element to ensure that the CSS output is properly displayed by the browser. At block 608, the wrapper template 205 defines the page level metadata, as described above, to locate the XML files 217 that will be used to generate the CSS output for the requested page.

The remote call 222 is further arranged to pass the aggregate parameters 215 from the user agent sniffer service 211, as indicated at block 611. In addition, at block 615, the mobile CSS service 132 receives a list of modules that are incorporated on the requested page.

At block 618, the "load" functional module 224 of the mobile CSS service 132 fetches and loads the located XML files 217 using an HTTP GET request. At block 621, the "extract" functional module 227 in the mobile CSS service 132 operates to extract the appropriate style elements and CSS code from the XML file 217. A query mechanism, such as an Xpath query, is then constructed. It is emphasized, however, that the Xpath query is merely illustrative and other conventional query types may also be utilized as required by a particular scenario. The Xpath query is utilized to locate all nodes in an XML file 217 that match aggregate parameters and/or list of modules on the page. For example, if a RAZR model of Motorola branded mobile phone having an Opera browser with XHTML rendering capability is the device requesting access to the page on the mobile web portal 125, the Xpath query constructed by functional module 227 would consist of:

```
(model = 'RAZR' or model = ' ') and
(browser = 'Openwave' or browser = ' ') and
(markup = 'xhtml' or markup = ' ')
```

This Xpath query would match all elements in the XML file 217 with "apply-to" attributes that are globally applicable to all devices, as well as to the particular RAZR® model making the access request. However, style elements in the XML file 217 applicable to SLVR® model Motorola mobile phones, for example, would not be matched.

At block 625, the Xpath query constructed in the previous step is run to retrieve applicable style elements containing CSS code from the XML file 217. The CSS code (i.e., the InnerText in the style element in the XML) is retrieved at block 629. At block 632, all the retrieved CSS code is concatenated into a single CSS code string. At block 635, the concatenated CSS code string is subjected to various optimizations by the "crunch" module 230 in CSS mobile service 132. Such optimizations may include, for example, removal of white space, tabulations, and comments in the concatenated CSS code string in order to make it as small as possible.

At block 638, the dynamically processed CSS code is output by the "output" functional module 233 to the calling wrapper template 205 as a CSS block. At block 640, the wrapper template 205 receives the CSS block and inserts it into the <style> element of the HTML page to thereby implement style sheet rendering inline with the markup. The illustrative method 600 ends at block 650.

While one particular illustrative method is shown in FIG. 6 and described above, variations in the described approach may be implemented as required to meet the requirements of a particular application. For example, in some implementations it might be sufficient to optimize the CSS to only device parameters but not the page modules. Or, utilization of various combinations of two or more of the characteristics (i.e., device type, browser type, markup, and page modules) may be sufficient to optimize the CSS to enhance a particular user experience or scenario.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating device-specific CSS, the method comprising the steps of:
   receiving parameters which describe a device that is seeking access to a page published by a content portal;
   applying a query to a file, the query being arranged to locate CSS blocks in the file that are associated with one or more of the parameters; and
   retrieving the associated CSS blocks from the file.

2. The computer-implemented method of claim 1 including a further step of concatenating the extracted CSS blocks into a single CSS code string.

3. The computer-implemented method of claim 2 including a further step of applying an optimization algorithm to the CSS code string to remove whitespace.

4. The computer-implemented method of claim 2 including a further step of sending the CSS code string to a process that is arranged to insert the CSS code string inline with markup that describes the page.

5. The computer-implemented method of claim 1 in which the parameters describe at least one of device-specific-feature, device model, type of browser operating on the device, or markup language capability of the device.

6. The computer-implemented method of claim 1 in which the device is a mobile communication device.

7. The computer-implemented method of claim 6 in which the mobile communication device is memory-constricted.

8. The computer-implemented method of claim 1 in which the file is an XML file.

9. The computer-implemented method of claim 1 in which a location for the file is identified by a metadata file.

10. The computer-implemented method of claim 1 in which the parameters are generated by a user agent sniffer service.

11. The computer-implemented method of claim 10 in which the parameters are mined from one of user agent string or header parameter.

12. A computer-implemented method for generating page-specific CSS, the method comprising the steps of:
   receiving a list of modules included on a page of content published by a content portal, each module describing either a link or a service call that may be invoked by a consumer of the page;
   applying a query to a file, the query being arranged to locate CSS blocks in the file that are associated with one or more of the modules in the list; and
   retrieving the associated CSS blocks from the file.

13. The computer-implemented method of claim 12 in which the retrieving comprises pulling code from an element in the file.

14. The computer-implemented method of claim 12 in which the list of modules is received via a remote call from the content portal.

15. The computer-implemented method of claim 14 in which the content portal includes templates that are utilized to generate the page and the remote call is generated from a wrapper template that is arranged as one of the templates.

16. A method for publishing a page of content, the method comprising the steps of:
   receiving a request from a device to access the page;
   receiving information that describes the device, the information describing at least one of device-specific feature, device model, type of browser operating on the device, or markup language capability of the device; and
   calling a service to receive i) CSS that is specific to the page, or ii) CSS that is specific to the device, the calling including one of sending the information to the service, or sending a description of the page to the service.

17. The method of claim 16 in which the calling further includes sending metadata to the service that describes a location of one or more files containing blocks of CSS that are used by the service.

18. The method of claim 16 in which the step of calling further comprises calling the service to receive iii) CSS that is globally applicable to all pages, or iv) CSS that is globally applicable to all devices.

19. The method of claim 16 in which the description of the page includes a description of one of modules, slots, service calls, or components that make up the page.

20. The method of claim 17 in which the one or more files validate against an XML schema which describes style elements and attributes associated with the style elements that indicate page modules or device characteristics to which the style elements are applicable.

* * * * *